April 20, 1965 R. H. WISE 3,178,753
WINDSHIELD WIPER
Filed Nov. 12, 1963 2 Sheets-Sheet 1
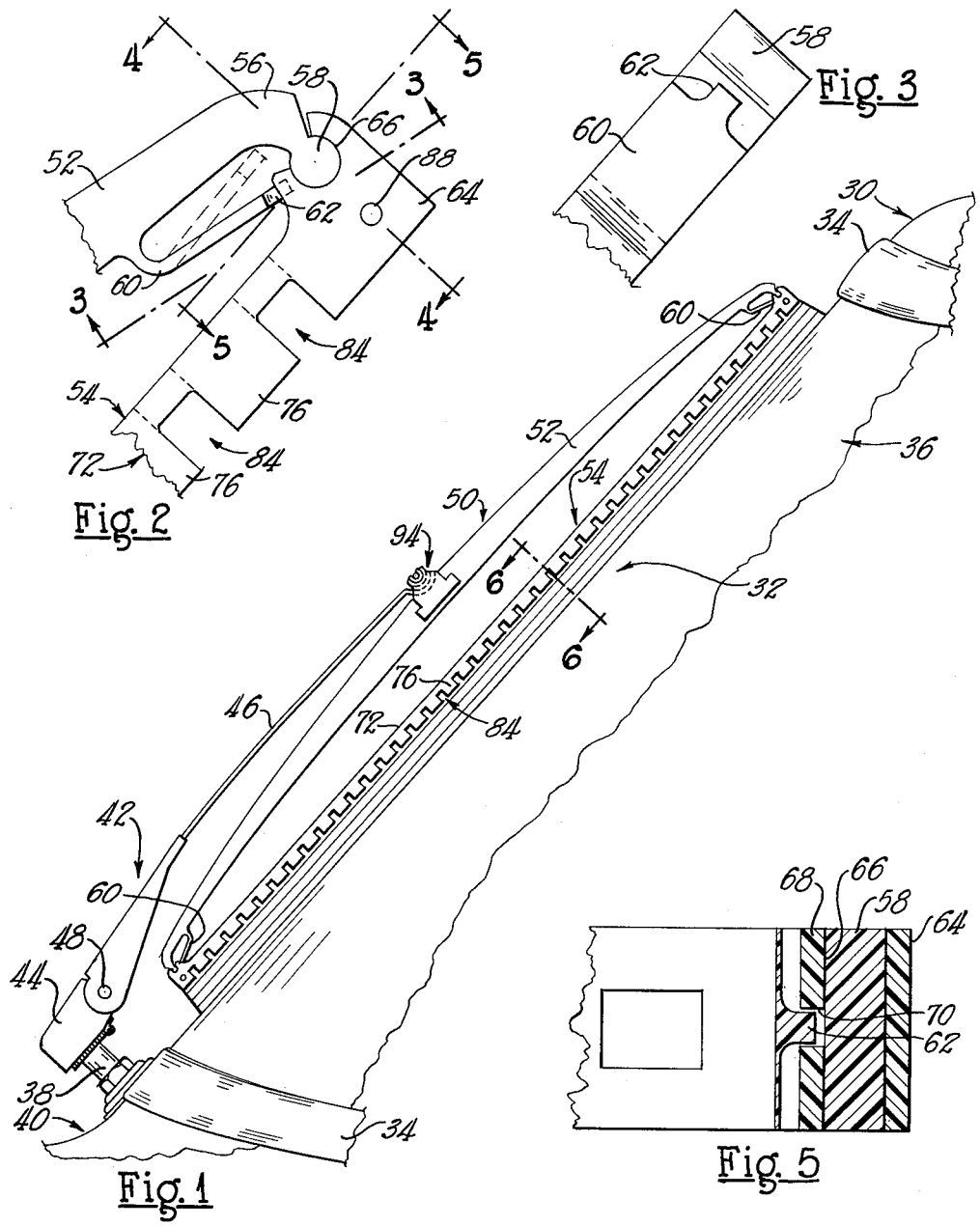
INVENTOR.
RALPH H. WISE
BY
WILSON, SETTLE & CRAIG
ATTORNEYS April 20, 1965 R. H. WISE 3,178,753
WINDSHIELD WIPER
Filed Nov. 12, 1963 2 Sheets-Sheet 2
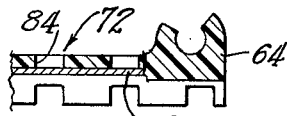
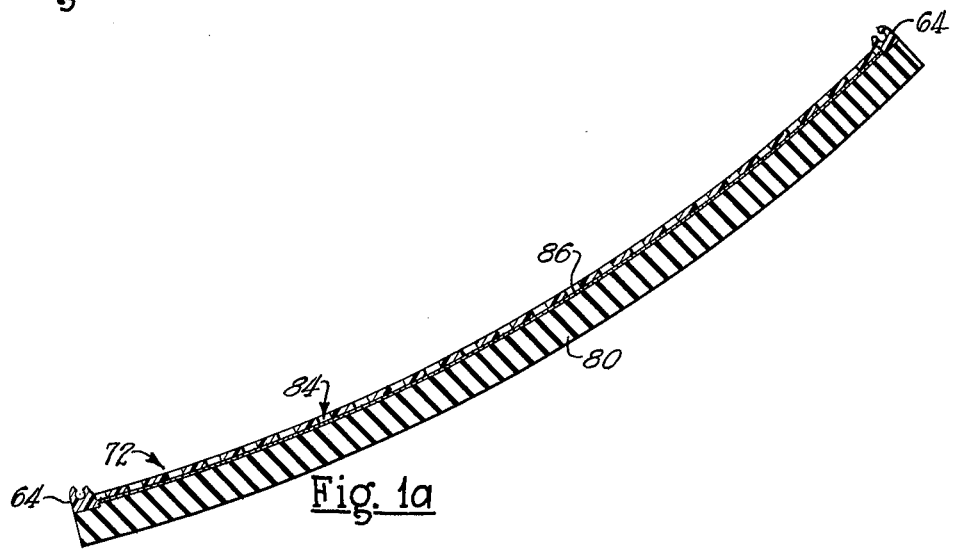
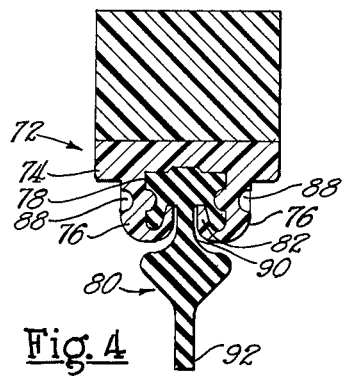
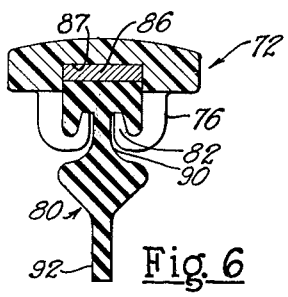
INVENTOR.
RALPH H. WISE
BY
WILSON, SETTLE & CRAIG
ATTORNEYS

United States Patent Office 3,178,753
Patented Apr. 20, 1965

3,178,753
WINDSHIELD WIPER
Ralph H. Wise, 26235 W. Warren Ave., Dearborn, Mich.
Filed Nov. 12, 1963, Ser. No. 322,981
3 Claims. (Cl. 15—250.42)

This invention relates to windshield wipers, and more particularly to a novel bow-type windshield wiper assembly made of synthetic resin, advantage being taken of the inherent flex characteristics of the resin to provide a novel result.

Status of the prior art

Windshield wipers of the prior art seem to have been made unnecessarily complicated because of the nature of the windshield surfaces that they are required to wipe. Present automobile windshields are of complex curvature, meaning that they are curved both vertically and transversely. Heretofore, wipers made as an attempt to positively and effectively wipe such a compound curvature surface have involved a complexity of parts. These have included wiffle-trees, linkages, springs, and other devices, to distribute compressive loading forces from the actuating arm to the blade for uniform application of pressure along the entire length of the blade for a supposedly smooth and uniform wiping action.

Deficiencies of these prior art structures are well known to substantially everyone and more particularly to the motorist whose automobile is fitted with the devices. The inherent defects include non-uniformly distributed load along the length of the wiping element, resulting in skips and streaks, exposure of component parts to atmospheric elements, including rain, sleet and snow, all of which produce corrosion. Also, snow and ice jam the parts, and the parts are heavy, complex and inherently expensive to manufacture.

Therefore, uniform wiping is not provided, thus nullifying to a substantial degree the additional visibility supposedly provided by the larger, more complex, curved windshields.

Accordingly, a substantial advance to the art would be provided by a novel windshield wiper characterized by simplified construction, improved wiping efficiency, and substantially lower manufacturing costs.

Accordingly, it is an important object of the present invention to provide a novel windshield wiper construction.

A further object is to provide a novel windshield wiper construction made of injection molded synthetic resin on an economical basis, and utilizing the inherent flex characteristics of the resin to produce an unexpectedly high wiping efficiency adapted to thoroughly clean complexly curved windshields.

A further object is to provide a windshield wiper having unique features of construction made from injection molded synthetic resin, and further incorporating novel end connectors.

A still further object is to provide a novel windshield wiper construction wherein an unstressed wiping edge is supported at each end for free and complete conformation to a curved windshield surface.

Other objects of this invention will appear in the following description and appended claims, reference being had to the accompanying drawings forming a part of this specification wherein like reference characters designate corresponding parts in the several views.

On the drawings:

FIGURE 1 is a side elevational view of a windshield wiper assembly of invention, illustrated with the blade in wiping position upon a complexly curved automobile windshield;

FIGURE 1a is a side elevational view, in section, of the wiping element in "free" condition, illustrating the reverse bias imparted by the stainless steel insert;

FIGURE 1b is an enlarged, fragmentary, axial sectional view similar to FIGURE 1a, showing entrapment of the stainless steel insert;

FIGURE 2 is an enlarged, fragmentary, side elevational view of the device shown in FIGURE 1;

FIGURE 3 is a bottom plan view taken along line 3—3 of FIGURE 2 with the wiper blade subassembly omitted;

FIGURE 4 is a sectional view taken along line 4—4 of FIGURE 2;

FIGURE 5 is an enlarged sectional view taken along line 5—5 of FIGURE 2; and

FIGURE 6 is an enlarged sectional view taken along line 6—6 of FIGURE 1.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

The environment as shown in FIGURE 1

A complexly curved, convex windshield of an automobile 30 is designated by the reference numeral 32 and is held in place in the windshield opening of the automobile body by suitable rubber gasketing means, not shown, but covered by trim moldings 34.

It will be observed that the windshield 32 is generally flat at the central portion but curved sharply at the end areas indicated by the reference numeral 36. It will be understood that as the windshield wiper moves in an arcuate manner across the windshield and traverses the end areas 36, it must traverse a rather sharp convex surface resulting from the sharp curvature at the end area.

The invention—general view

Continuing to refer to FIGURE 1, it will be noted that the automobile 30 includes as a component part thereof a pivot shaft 38 actuated by a concealed windshield wiper motor beneath the cowling 40. A windshield wiper arm assembly 42 is connected to the exposed end of pivot shaft 38 and includes an arm socket 44. To the socket 44, the arm 46 is pivotally attached by means of a pin connection 48 and is spring loaded toward the windshield 32 by a concealed spring. As will be evident, the concealed spring provides the force by which the wiper blade is biased against the windshield to wipe it free of atmospheric materials directed thereagainst.

The wiper assembly of invention—perspective view

The windshield wiper assembly of invention is designated 50 and includes a bow sub-assembly 52 and a wiper blade sub-assembly 54.

It should be pointed out at this time that the bow sub-assembly 52 is of injection molded synthetic resin, preferably being formed of Delrin, a trademark of the du Pont Company. As will become apparent, this synthetic resin, or plastic as more loosely used, possesses unique flex characteristics. These have been used to advantage in the present design to provide improved economy of manufacture, yet unexpectedly improved wiping efficiency.

The wiper blade sub-assembly 54 is detachably connected to the bow sub-assembly 52 at its ends only, so that blade replacement is greatly facilitated as compared to the cumbersome operations of the prior art; such usually being so cumbersome that an entire wiper mechanism was usually sold instead of replacing only the blade; an unwarranted expense to the motoring public.

Pivotal connection of bow and wiper

The manner in which the wiper blade sub-assembly is pivotally attached to the bow sub-assembly is more clearly shown in FIGURES 2 and 3. Thus, the bow arm 52 curves downwardly at the end at 56, terminating in a transverse cylindrical rod end 58.

Inwardly of the downward curve 56, there is integrally formed with the bow 52 an index-securing lip 60. As shown in FIGURE 3, this lip 60 is reduced to a tip or tab 62. Referring to FIGURE 2, it will be noted that the lip 60 has a normal position shown in solid outline, but being flexible, can be moved upwardly to the dotted outline position to release the wiper blade sub-assembly 54.

Turning now to FIGURE 5, the manner in which the tip 62 interlocks with the terminal end of the wiper blade sub-assembly is illustrated. The wiper blade sub-assembly 54 at its terminal end comprises an enlarged pivot socket body 64 having a cylindrical female recess 66, FIGURE 2, to receive the rod end 58 of bow 52. Note in FIGURE 2 that the top of recess 66 is opened to partial diameter (about ½) of rod end 58 to permit a pivot action between parts 52 and 54. The inside ledge 68 of pivot socket body 64, as best shown in FIGURE 5, is slotted at 70 to receive the tip 62 of index-securing lip 60. This assembly is effected by pushing the lip 60 upwardly to the dotted outline position and at the same time sliding rod end 58 into recess 66, and thereafter releasing lip 60 so that the tip 62 snaps downwardly into slot 70 to provide a locked or assembled condition of parts.

Both ends of bow 52 are manufactured in this same manner, and wiper blade replacement is therefore effected by duplicating at each end the action just described for the right end as illustrated in FIGURE 1 to replace the blade. Removal is effected in reverse.

The structure of the wiper blade sub-assembly 54

FIGURES 1, 1a, 1b, 4 and 6 will now be referred to for the purpose of more fully describing the structure of the wiper blade sub-assembly 54. As shown in FIGURE 4, the wiping blade support 72 is formed with a transversely thickened body web 74 having a plurality of integral longitudinally spaced transversely opposed pairs of arm elements 76 which project downwardly from web 74 to embrace the base 78 of the wiping rubber 80. Support 72 is also made of Delrin resin. The upturned terminal ends 82 of arms 76 provide bottom support at spaced points along the length of the base 78 of the wiping rubber 80. By reference to FIGURE 1, it will be evident that the arms 76 are uniformly spaced along the length of the blade support 72. The longitudinal spacing between arms 76 reduces the weight of support 72 by reducing the amount of material. This lighter weight provides more responsive wiping blade action. Further weight reduction and increased flexibility are achieved by forming spaced openings 84 through web 74 (FIGURE 1b).

Referring to FIGURES 1a and 1b, it will be noted that a stainless steel flex element 86 is seated within an elongate groove 87 formed in the lower side of web 74, the width of groove 87 being equal to the transverse width of base 78 and the depth of the groove being slightly greater than the thickness of flex element 86, so that base 78 projects into the groove as best seen in FIGURE 6. Thus, element 86 is entrapped in the wiping blade support 72 beneath the wiping rubber 80, see FIGURE 6 also. The purpose of this unit 86 is to impart a flex response to the synthetic resin of support 72 that becomes a combination of the flex response of the synthetic resin, modified by the flex response of the stainless steel. This combination also provides a "built-in" bias along the entire length of the wiping edge for improved intimate contact with the windshield surface 32.

It should be noted at this point by reference to FIGURE 1a that flex element 86 has a reverse bias, providing a reverse bow to unit 72 in the "free state." This provides a constant tendency of the ends of the wiper element to lift away from the windshield surface toward the face of the bow sub-assembly 52. But, by application of force toward the windshield surface through the bow 52, overcoming the reverse bias, it will be evident that the central portion as well as portions between it and the ends will be uniformly held against the windshield surface along its entire length. Bow 52 holds unit 72 in tension in the assembled condition.

Note that flex element 86 does not extend to the extreme ends of support 72, see FIGURE 1b; also note its absence from FIGURE 4 which is a section taken through the unit beyond an end of the stiffener 86. The reverse bias does not have a tendency to be more generally concentrated along the central or medial portion of the wiping rubber 80. The advantage of flex element 86 is that it provides a way in which the bias of the blade can be specifically tailored to a particular wiping application on a windshield. Thus, shortening, lengthening, adjusting spring rate, resilience, amount of body and other factors can be made in various combinations to provide any degree of pressure distribution and flex response desired.

Further, in those instances where the resin may have a slow flex return, the steel will overcome such slow return because of its higher spring rate. Therefore, by tailoring the spring rate and mass of the steel to modify the plastic, the plastic can be made to perform as desired for a particular application.

Wiping rubber securement

Referring to FIGURE 4, note the two small oppositely positioned dimples 88. These are suitably made by a tool having opposed heated tips that are pressed against the heat-softenable resin at the dimple points 88 to indent the resin and bite into the rectangular base 78 of wiping rubber 80 to lock it in place. It is to be understood that the wiping rubber 80 is assembled to the wiping blade support 72 by being slidably inserted between depending arm elements 76 with the hinge section 90 between the upturned terminal arm ends 82. The base 78 of the wiping rubber 80 is therefore cradled and embraced along its entire length, but the remainder, including wiping edge 92, remains exposed for full flexibility to conform to the varying windshield surface as it passes thereover.

Attachment of bow 52 to actuating arm 46

Referring to FIGURE 1, note the placement of a connector 94 centrally of bow 52 to receive the free end of actuating arm 46, in a manner whereby the entire wiping assembly 50 can be quickly attached and thus positioned in operable relationship to the windshield 32.

For further details of the connector 94, please refer to copending application Serial No. 322,982, filed November 12, 1963.

Delrin is the synthetic resin specifically referred to above. However, other materials having analogous flex and working characteristics are to be included within the scope of invention. In some instances, various ones of the nylons may be desirable.

Delrin is the du Pont Company's registered trademark for thermoplastic acetal resin $(-(-OCH_3-)_n)$.

While certain embodiments of this invention have been described, it will be apparent to those skilled in the art that the disclosed embodiments may be modified. Therefore, the foregoing description is to be considered exemplary rather than limiting, and the true scope of the invention is that defined in the following claims.

I claim:

1. In a windshield wiper assembly having a bow: a wiper subassembly comprising an elongate wiping blade support of a flexible molded resin material, said blade support having a transversely thickened body web and a plurality of longitudinally spaced transversely opposed pairs of arms integral with said web and projecting downwardly therefrom, an elongate wiping blade having a base engaged between said arms and retained thereby beneath said web, means defining an elongate groove in the underside of said web adapted to receive said base, an elongate resilient metallic flex element seated in said groove and retained therein by said base of said wiping blade, said flex element exerting a resilient biasing action over the length of said subassembly urging the central portion of the web downwardly relative to the ends of the web, and means at each end of said web for pivotally connecting said subassembly to said bow.

2. In a windshield wiper assembly,
a resilient, elongated bow having spaced ends,
a wiper sub-assembly, comprising
a wiping blade support having an elongated body of resilient material with spaced ends,
each said end of said bow being formed as a transversely extending cylindrical rod,
each said end of said support being formed as a transversely extending cylindrical recess complementing a rod end,
said recess being defined by resilient walls forming an opening less than the diameter of a rod end,
one wall of said recess defining a notch,
a resilient index-securing lip extending from said bow adjacent each end, and toward each end, and each lip terminating in a tip receivable in said notch,
whereby moving a lip out of normal position and toward the bow and simultaneously sliding a rod end into a cylindrical recess and thereafter releasing the lip, causes the tip to snap into the associated notch providing an assembled condition of parts,
and a wiping blade carried by said support.

3. In a windshield wiper assembly,
an elongated, resilient bow having spaced ends,
a wiping blade support having an elongated body of resilient material and having spaced ends,
each said end of said bow being formed as a pivot element,
each said end of said support being formed as a pivot element complementary to a bow end pivot element,
means retaining said pivot elements in operative relation with one another with the bow and support assembled together,
said support being formed of resilient resin and having a generally U-shaped section with a bight portion and reversed arm elements spaced along its length on one side,
a stainless steel flex element embraced between the ends of said support and between said arm elements,
a wiping rubber having an elongated base embraced between said arm elements to combine with the flex response of the resin of said support to provide a modified flex response thereto and bias the length of the wiping edge toward a surface to be wiped.
and means securing said wiping element in position embraced by said body of said support.

References Cited by the Examiner

UNITED STATES PATENTS 2,920,336  1/60  Anderson _____ 15—250.42
3,107,384  10/63  Wise _____ 15—250.42

FOREIGN PATENTS 1,060,421  11/53  France.
1,262,991  4/61  France.

CHARLES A. WILLMUTH, *Primary Examiner.*